US006554562B2

United States Patent
Dudebout et al.

(10) Patent No.: US 6,554,562 B2
(45) Date of Patent: Apr. 29, 2003

(54) COMBUSTOR HOT STREAK ALIGNMENT FOR GAS TURBINE ENGINE

(75) Inventors: Rodolphe Dudebout, Phoenix, AZ (US); Mark C. Morris, Phoenix, AZ (US); Douglas P. Freiberg, Phoenix, AZ (US); Craig W. McKeever, Gilbert, AZ (US); Richard J. Musiol, Tempe, AZ (US); Ardeshir Riahi, Phoenix, AZ (US); William J. Howe, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 72 days.

(21) Appl. No.: 09/882,518

(22) Filed: Jun. 15, 2001

(65) Prior Publication Data

US 2003/0002975 A1 Jan. 2, 2003

(51) Int. Cl.$^7$ ................................. F01D 9/04
(52) U.S. Cl. ................ 415/1; 415/191; 415/208.2
(58) Field of Search ................ 415/1, 191, 208.1, 415/208.2, 209.2, 209.3

(56) References Cited

U.S. PATENT DOCUMENTS

| | | | |
|---|---|---|---|
| 3,018,624 A | * | 1/1962 | Bonsall et al. ............. 60/39.37 |
| 4,305,248 A | | 12/1981 | Wright |
| 4,733,538 A | | 3/1988 | Vdoviak et al. |
| 5,486,091 A | | 1/1996 | Sharma |
| 5,915,918 A | | 6/1999 | Benden |
| 5,984,631 A | | 11/1999 | Tolgos |
| 6,419,446 B1 | * | 7/2002 | Kvasnak et al. ............ 415/191 |

* cited by examiner

Primary Examiner—Edward K. Look
Assistant Examiner—Richard A. Edgar
(74) Attorney, Agent, or Firm—Robert Desmond, Esq.

(57) ABSTRACT

A method and apparatus to reduce the average and maximum temperatures to which the nozzles in the hot-section of gas-turbine engine are subjected is described. The method relates to the circumferential alignment of fuel nozzles and downstream turbine nozzles in a gas turbine engine. This situates the hot-streak emerging from each fuel nozzle in between the like-numbered turbine nozzle airfoils. The most severe operating condition for reducing the durability of nozzle airfoils is the one generating hot operating temperature conditions. By identifying the temperature profile passing through downstream nozzle airfoils, airfoils in static stages can be selectively spaced around the circumference of the ring attached to the casing of the gas turbine engine to avoid high temperature exposure to the airfoils. This method and apparatus mitigates the worst oxidation and thermo-mechanical fatigue damage in the airfoils by allowing the hot gas regions to pass through the path in between two adjacent airfoils.

30 Claims, 5 Drawing Sheets

COMBUSTOR HOT STREAK ALIGNMENT FOR GAS TURBINE ENGINE

BACKGROUND OF THE INVENTION

The present invention generally relates to a gas turbine engine, such as one used in aerospace or industrial application, in which a combustor with discrete fuel nozzles burns fuel and discharges hot gases into a conventional turbine engine. More particularly, the present invention relates to a method and apparatus for circumferential alignment of fuel nozzles and downstream turbine vanes on a gas turbine engine to significantly improve the hot-end durability for the static components.

A turbine engine normally includes stages of static airfoils, commonly called vanes, inter-spaced between stages of rotating airfoils, commonly called blades.

The combustor typically includes a discrete number of fuel nozzles, which deliver fuel and facilitate mixing with the air to achieve a stable, self-sustainable flame in the combustor chamber. Although it would be desired to have a uniform circumferential temperature field at the combustor exit, hotter and colder zones exist due to the discrete number of fuel nozzles. The hotter zones of combustion gas are commonly known as hot streaks. These hot streaks are known to pass through a first stage of vanes, the following blades, and on to the second stage of vanes. Similar interaction occurs between subsequent stages of the turbine engine.

More specifically, a hot-streak is a high temperature gas stream that passes through airfoil stages, both vanes and blades. The impact of having a hot-streak impinge on the stationary vane is a significant increase in airfoil metal temperature, leading to accelerated oxidation, thermo-mechanical fatigue, and a commensurate reduction in durability. This reduction in durability of the first-stage vane leads to frequent replacement at a high cost to turbine engine operators. When an airfoil is exposed to a higher temperature environment, the mechanical damage in the airfoil metal accelerates faster, causing the airfoil to lose its durability. Therefore, the durability of stationary vanes highly depends on the maximum hot-streak temperature. When a fuel nozzle is fouled by carbon, or if significant combustor flow field variability exists, the hot-streak temperature tends to increase and results in significant damage to the stationary vanes. Thus, vane durability can be improved if the vane airfoils are placed in generally cooler regions of combustion gas.

U.S. Pat. No. 5,486,091, Jan. 23, 1996 for Gas Turbine Airfoil Clocking, clocks the wakes from upstream stages of turbine airfoils to impinge the wakes on the leading edge of downstream stages of turbine airfoils. Clocking of the wakes specifically takes place at the long term operating condition. The '091 claims that, at each successive stage of nozzle airfoils, the efficiency of the gas turbine engine is improved.

While a wake is an aerodynamic disturbance in the flow field, a hot streak is a temperature difference phenomenon. A wake is a zone of aerodynamic disturbance produced by a body such as an airfoil vane or blade placed in a flow stream. The wake is a low momentum region of fluid flow downstream of a body caused by the body's profile and surface roughness. The body produces profile drag because the body exerts a force on the fluid, thus reducing the fluid momentum. The body also produces viscous drag due to the airfoil surface boundary layer, which also reduces the fluid momentum. The result of the profile and viscous drag is a region of low momentum fluid (the wake) which propagates downstream and causes pressure losses as the wake mixes with the free-stream fluid. Wake propagation to downstream stages is a result of mixing from shear forces due to velocity gradients in the flow field.

By contrast, a hot streak is a zone of hot fluid relative to the surrounding flow field. It requires no body (such as a vane or blade airfoil), is not a momentum deficit region like a wake, and is not associated with profile or viscous drag phenomenon. A hot streak is a temperature difference phenomenon, which propagates downstream by conduction and convection mixing of warmer and cooler fluids. Thus, tracing wake or hot streak propagation to downstream airfoil stages requires different analyses. To trace the hot streak, a non-uniform temperature profile must be imposed in the analysis model. The hot streak can then be traced by inviscid tools. Tracing a wake requires no specific inlet temperature profile. However, a viscous analysis or an inviscid analysis utilizing an artificial method to generate the wake must be used. A standard unsteady inviscid analysis will not be capable of tracing a wake but can be used to trace a hot streak. Both vector diagram and Computational Fluid Dynamics (CFD) analyses have shown that the fluid in a hot streak is accelerated through the vane and rotating blade stages differently than the surrounding cooler fluid, because it is less dense than the surrounding fluid (due to its increased temperature). The hot streak fluid thus accelerates to a higher velocity than the surrounding cooler fluid, resulting in a different vector diagram for the hot streak fluid. Therefore, a wake and a hot streak do not follow the same paths as they propagate to downstream airfoil stages. As a result, aligning downstream components by wake analysis is fundamentally different than aligning components by hot streak analysis. Further, an approach for improving engine efficiency is not necessarily the same as one for improving the durability of the hot section vanes, which involves hot streak temperature effects.

Moreover, the hotter operating temperature conditions, and thus the more severe hot streak damage to airfoils, typically occur at take-off and high temperature climb conditions, where turbine inlet temperatures are at their highest, and where the majority of the oxidation and thermomechanical fatigue damage can occur. A turbine engine aircraft may spend only a small fraction of its time at take-off and high temperature climb conditions. Therefore, optimization for the long term operating condition for turbine engine efficiency may not likely address hot streak damage and the durability of airfoils.

In an effort to control the temperature of hot gases at the combustor exit plane to enhance vane durability, U.S. Pat. No. 4,733,538, Mar. 29, 1988 for Combustion Selective Temperature Dilution, first establishes a pre-selected, desired temperature gradient exiting a combustor to purposely suppress the gas temperature in the region of the vane airfoil. By virtue of a specific placement of dilution air apertures, such pre-selected or favorable temperature gradient or distribution of high and low temperature zones is achieved. The dilution air apertures are aligned downstream of the fuel nozzles and axially aligned with the turbine vanes, as well as aligned with gaps between the vanes. One set of apertures directs some dilution air to a region physically close to the vane airfoils to permit such air to suppress the gas temperature near the vane airfoils. Another set of apertures directs some dilution air in between the vanes. Thereby, the temperature of the hot gases near the vane airfoils is reduced below the average gas temperature, while the temperature of the hot gases flowing between the vane airfoils is in excess of the average gas temperature. Accordingly, the temperature profile exiting the combustor is altered to obtain the preselected temperature profile to enhance durability for the existing placement of the vanes, and the placement of the vanes is not altered.

However, the placement of such dilution air apertures downstream in the combustor may be disadvantageous. For example, the dilution air may be better used in the combustor to meet stringent emissions and smoke requirements or to enhance durability of combustor components.

As may be seen from the foregoing discussion, there is a need for a method and apparatus that provides improved airfoil durability from alignment of combustor hot streaks to downstream turbine vanes.

SUMMARY OF THE INVENTION

In one aspect of the present invention, a method is provided to significantly reduce the average and maximum temperatures to which the turbine vane airfoils in the hot-section of a gas-turbine engine are subjected. This method relates to the circumferential alignment of fuel nozzles and downstream turbine vane airfoils on a gas turbine engine and positions the hot-streak emerging from each fuel nozzle in between the like-numbered of turbine vane airfoils. By employing computational fluid dynamic models, aerodynamic particle tracing using vector diagrams, or experimentally determined alignment from engine testing, information required for the circumferential alignment can be obtained for the vane airfoils to be placed away from the combustor periodic hot streaks. The advantage of this invention is to significantly improve the hot-end durability for the static components.

In another aspect of the present invention, a turbine engine embodies hot streaks emerging from fuel nozzles and directed in between the nozzle airfoils. For maximum airfoil durability, the number of vanes at different turbine stages is the same as the number of fuel nozzles. The vane airfoils in each turbine stage are circumferentially placed to avoid the high temperature zones generated by the combustor periodic hot streaks.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

In general, the present invention applies to a gas turbine engine (aero or industrial) in which a combustor with discrete fuel nozzles burns fuel and discharges hot gases into a conventional turbine. Unlike the prior art, which seeks to align airfoil wakes to hit downstream airfoil leading edges for improved efficiency, the present invention aligns the hot streak emerging from each fuel nozzle in between, and not in line with, each successive stage of nozzle airfoils, thus improving the durability of the hot section. Further, and unlike the prior art, the present invention aligns the hot streak in between the turbine airfoils at peak operating temperature conditions which produce significant hardware distress and durability issues, rather than at the long term operating condition.

Additionally, and in contrast to the prior art, the present invention does not require altering a temperature profile exiting the combustor. Rather, the present invention maps or determines the resulting temperature profile, aligns vane airfoils in accordance with the profile, and leaves the profile or temperature non-uniformity unaltered. The position of the vanes can then be altered. Thereby, the present invention eliminates the need for means, such as dilution air apertures, to alter or pre-select the temperature profile.

Figure 1:
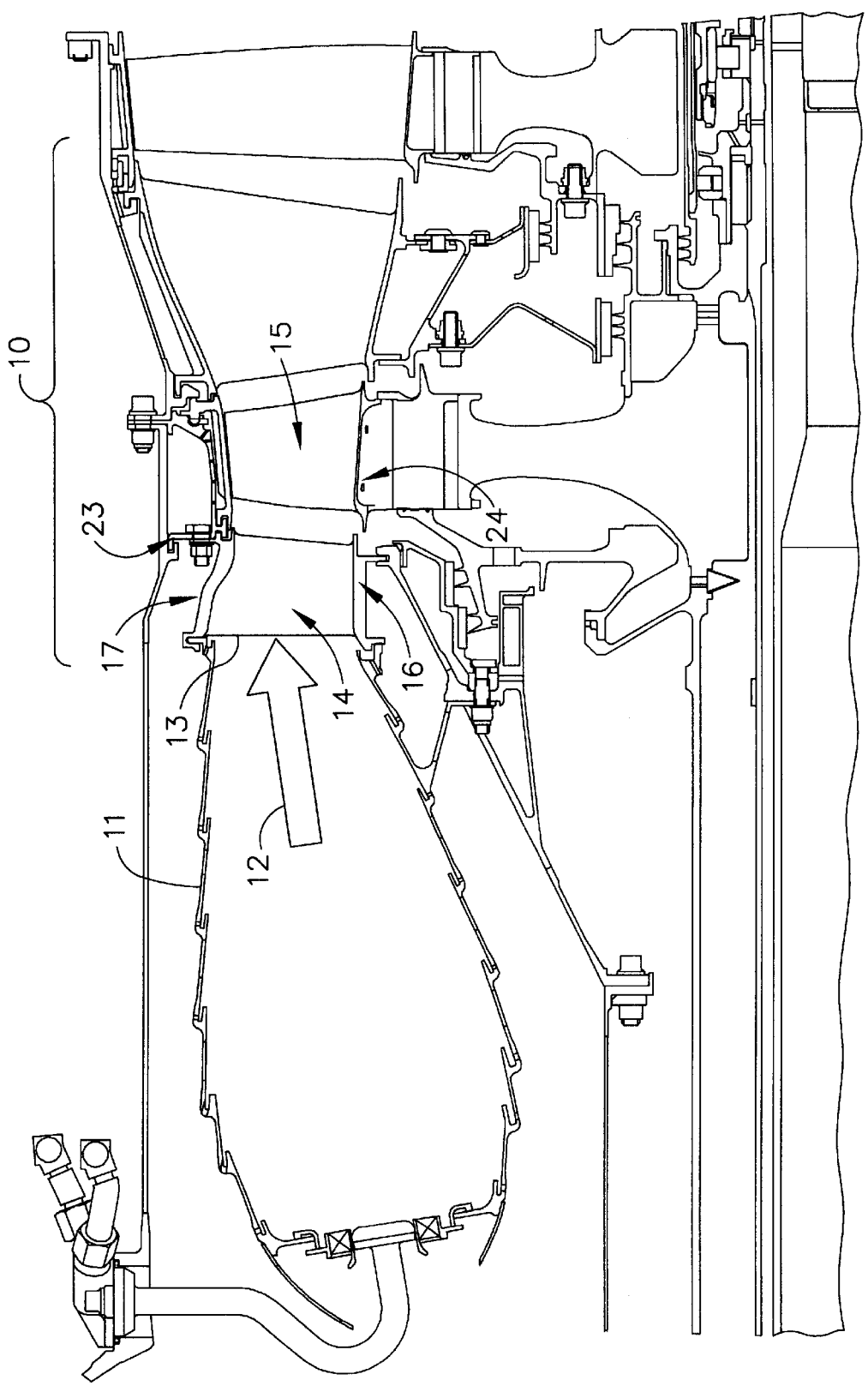
FIG. 1 is a cross sectional view of a typical turbine section of a gas turbine engine that can employ the method and apparatus of the present invention.

Referring to FIG. 1, a turbine section of a typical gas turbine engine is generally denoted by reference numeral 10 and in which the present invention may be incorporated. In operation, hot gas, represented by arrow 12, flows from an engine combustor 11 to a turbine nozzle 13 that is comprised of a circumferential row of vane airfoils 14. The hot gas 12 then flows through a circumferential row of rotor blades 15. The vane airfoils 14 and rotor blades 15 are formed from suitable turbine blade material capable of withstanding (with adequate cooling) high gas temperatures. As shown, the vane airfoils 14 project radially outwardly from an inner circumferential end wall 16 to an outer circumferential end wall 17. These end walls 16, 17 are preferably segmented in higher temperature turbine stages and are often full rings in lower temperature turbine stages. The outer circumferential end wall 17 is mounted to a turbine housing 23 in a manner familiar to those skilled in the art. The turbine rotor blades 15 project radially outward from inner turbine rotor circumferential platforms 24.

Figure 2A:
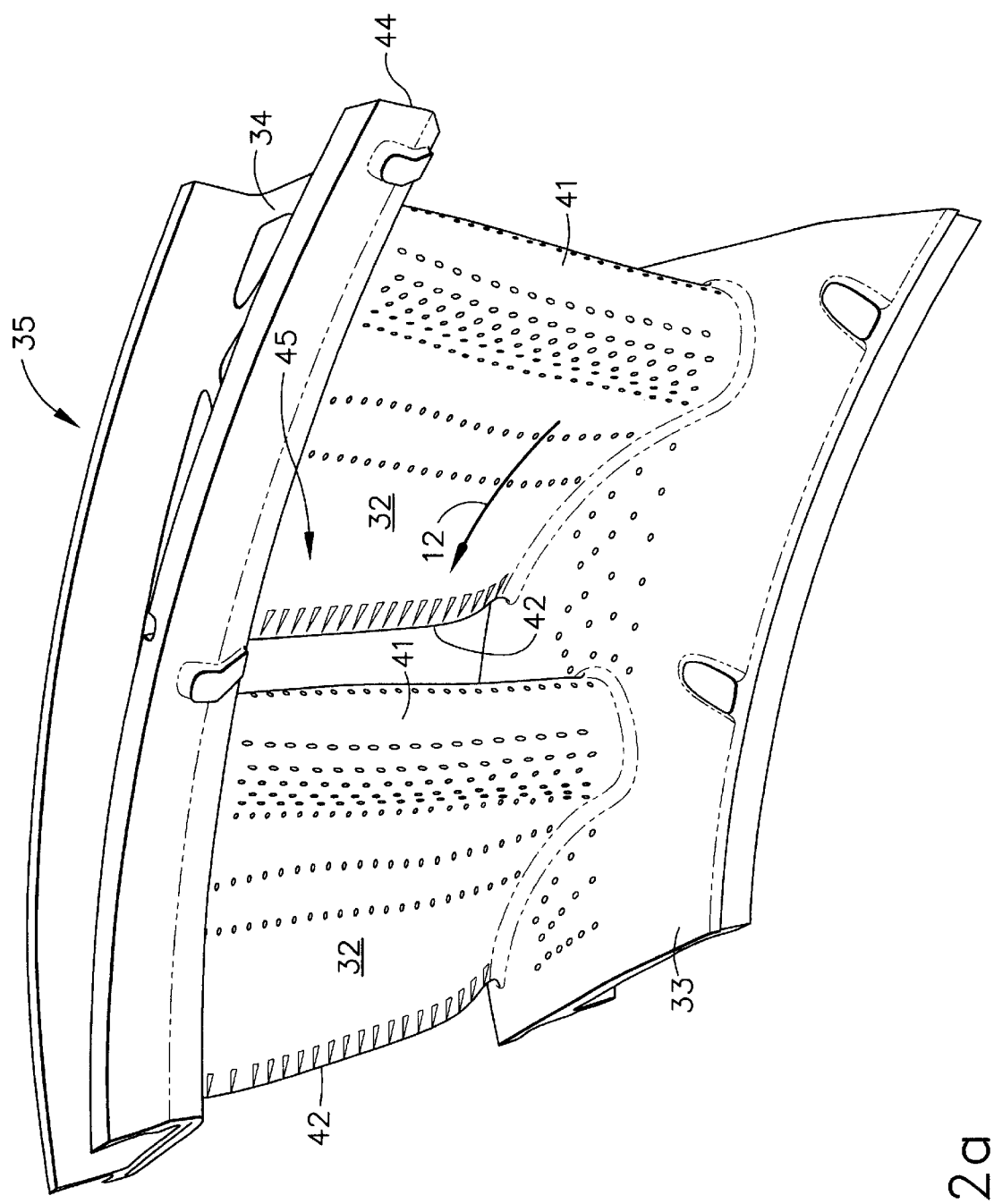
FIG. 2a is a cross sectional view of a turbine vane segment, wherein the vane segments are assembled together to form a full annulus ring, commonly called a nozzle, and specifically illustrating the orientation of gas flow relative to airfoils as contemplated by the present invention.
Figure 2B:
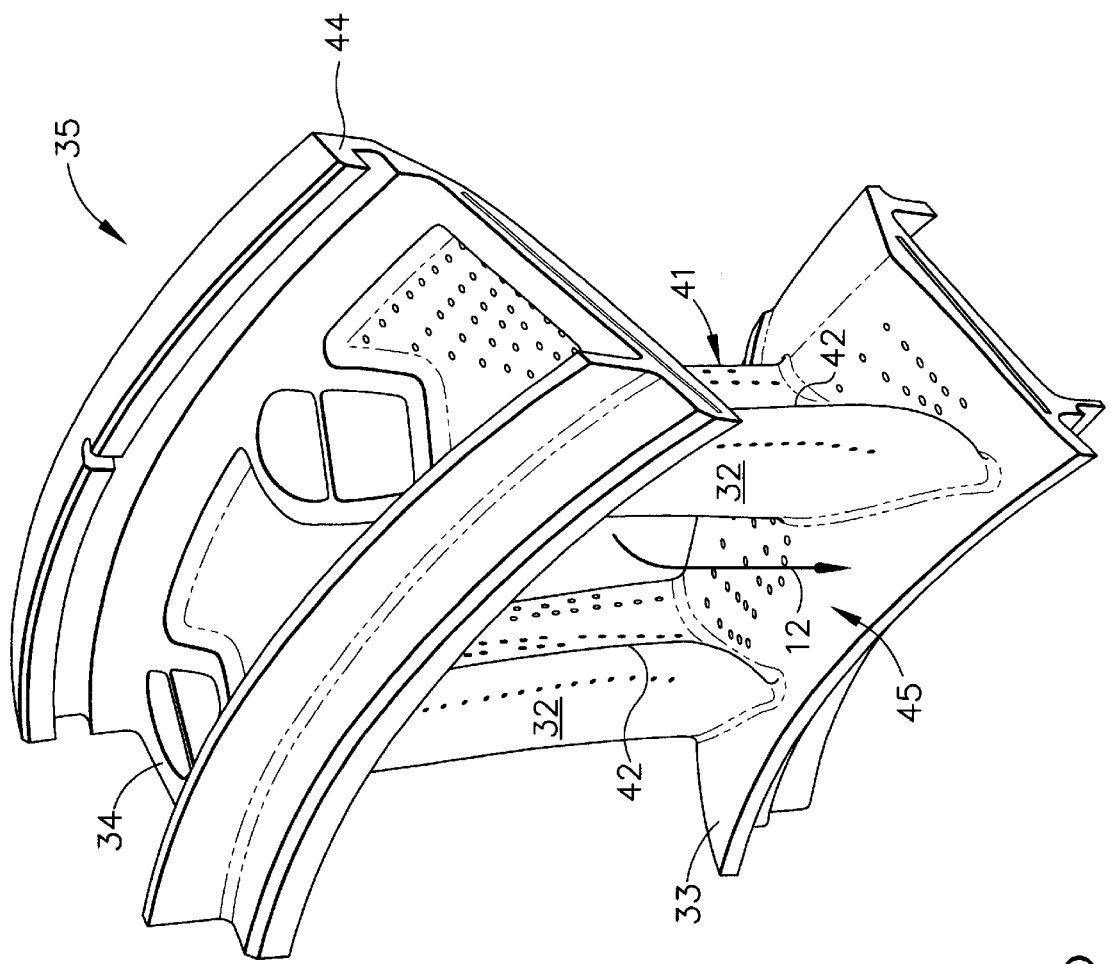
FIG. 2b is a cross sectional view of the vane segment shown in FIG. 2a from another direction.

FIGS. 2a and 2b are perspective views of a turbine vane segment 35—including a vane airfoil 32, an inner platform 33, and an outer platform 34—which can be employed in conjunction with the present invention. A leading edge 41 of the vane airfoil 32 defines a nozzle inlet plane 44. A trailing edge 42 of the vane airfoil 32 around the circumferential ring 33 defines a nozzle exit plane 45. From a combustor (not shown), hot air flow 12 enters the stator nozzle inlet 44 at the leading edges 41 of airfoils 32. The hot air flow 12 then passes between adjacent turbine vane airfoils 32 and between the trailing edges 42.

Although it is desirable to have a uniform circumferential temperature field at the combustor exit, periodic hotter and colder zones exist due to the discrete number of fuel nozzles. The hotter zones of combustion gas are commonly known as hot streaks. Computational fluid dynamics analysis and test data have shown that a circumferential temperature distribution, having varying high and low temperature fields, is present at the stator airfoil leading edge 41. When hot streaks are located near the region of the stator airfoil leading edge 41, and in the absence of the present invention, the hot gas flow 12 will accelerate the oxidation and thermo-mechanical fatigue damage in vanes 32 causing a reduction in its durability.

Figure 3:
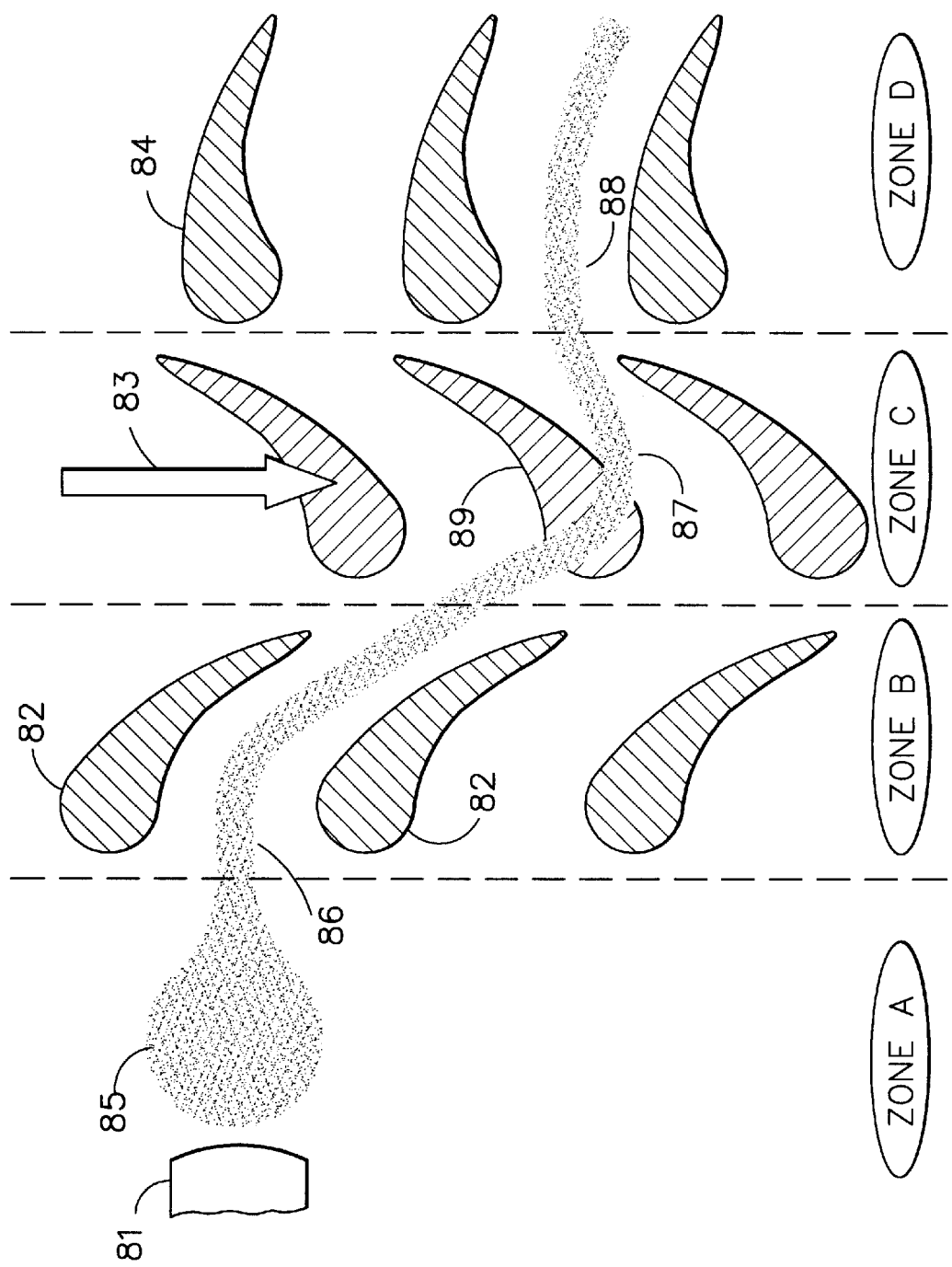
FIG. 3 is an illustrative schematic of a multiple-stage turbine engine showing the relative orientations of a fuel nozzle, hot streak generated from combustion, vane airfoils in a static nozzle, blade airfoils in a rotor stage, and second stage vane airfoils in a downstream static nozzle as contemplated by the present invention.

Referring to FIG. 3, the schematic diagram depicts the method and apparatus of the present invention. Zone A represents the combustor section. Zone B represents the first-stage turbine nozzle section. Zone C represents the rotating first-stage turbine section. Zone D represents the second-stage turbine nozzle section.

In zone A, a fuel nozzle 81 sprays liquid fuel into the combustion chamber (not shown), atomizing the liquid into small droplets which readily vaporize. The vaporized fuel is then mixed and burned with compressor discharge air to produce a self-sustaining flame 85. As is known in the art, tuned combustor aerodynamics can ensure a stable, self-sustaining flame which is then quenched via dilution air to ensure an acceptable exit temperature distribution for the downstream turbine components. Because of the discrete fuel-injection points in a gas turbine combustor, each fuel nozzle 81 produces a characteristic hot-streak 86 which can be measured at the combustor exit plane.

The hot streak 86 is a hot temperature zone of gas, with the center zone of the hot streak being the hottest spot, as further described below. As the hot streak 86 enters the inlet plane of the first-stage stator nozzle—zone B—the hot temperature zone can accelerate the thermo-mechanical fatigue and oxidation of a vane 82 due to the temperature increase in the vane 82 as it is exposed to increased temperature from the hot streak 86. This interaction between hot streak 86 and non-rotating vane 82 results in decreased durability. However, the fatigue and oxidation are reduced and/or eliminated in accordance with the present invention because the center of the hot streak 86 is preferably maximally away from each vane airfoil 82. Otherwise, as the center of the hot streak 86 is situated further more towards one vane 82, the adverse temperature effect on such one vane 82 may increase while the adverse temperature effect on an adjacent vane 82 decreases.

Therefore, an embodiment of this invention positions two circumferentially adjacent vanes 82 so that the center zone of, and preferably the entire field of, the hot streak 86 passes between the adjacent vane airfoils 82. More preferably, the center zone of the hot streak 86 passes through a midpoint or 50% point of the circumferential space defined by the two adjacent vane airfoils 82 such that the outer areas of the field of the hot streak 86 do not impinge on the adjacent vane airfoils 82, as depicted in FIG. 3. Thereby, at the 50% point, the hottest spot of the hot streak 86 passes through the adjacent vanes with equal un-impinged vane areas on both sides of the hot streak 86. This is in contrast to the prior art wherein the hot streak (including the hottest center spot) may impinge on the leading edge of a vane airfoil, causing a significant increase in vane airfoil metal temperatures, accelerated oxidation, thermo-mechanical fatigue, and a commensurate reduction in durability. It is also in contrast to the prior art where the fuel nozzles are aligned with dilution holes and with the leading edges of the vane airfoils, as opposed to in between them.

Alternatively, the present invention contemplates that the coolest spots in the hot streak 86 field (i.e., the peripheral or outer areas) may come in contact with the vanes 82, thereby producing minimal temperature effects on adjacent vanes 82. However, the hottest center spot of the hot streak 86 still avoids contact with the vanes 82. Accordingly, the present invention contemplates that the position of the hot streak 86 center can vary from a 50% mid point of the defined circumferential space to a 35% point measured from either vane 82, as depicted in FIG. 3. In other words, at a minimum, the hottest spot is at a 35% point from either vane 82 and, at a maximum, is at a 50% point from either vane 82. This, too, is in contrast to the prior art wherein the center of the hot streak may impinge on the leading edge of a nozzle airfoil or where the fuel nozzles are aligned with dilution holes and with the leading edges of the vane airfoils.

To achieve the foregoing positioning or alignment of the circumferential periodic hot streaks 86 in accordance with the present invention, various methods may be employed. Well-known CFD models, conventional aerodynamic particle tracing using vector diagrams, and experimentally determined alignment from engine testing are all convenient methods which provide information to quantify the required circumferential alignment needed for the stationary nozzle airfoils to be placed away from the periodic hot streaks 86.

The circumferential alignment of the static first-stage turbine nozzle airfoils 82 in between the hot streaks 86 is predicated on the number of fuel nozzles being equal to the number of first-stage turbine nozzle airfoils. Otherwise, and with an unequal number, some hot streaks 86 would pass inline with the first-stage nozzle airfoils, and some in between. A turbine engine contemplated by this embodiment may have as many fuel nozzles as practically possible but at least twelve (12) may be needed. The minimum number of twelve may be required to meet the combustor emission and exit temperature requirements.

Still referring to FIG. 3, and further downstream from where the hot streak 86 enters the area between the first-stage turbine vane airfoils 82, the hot streak 86 is deflected by the flow field created by the airfoils 82 and enters the rotor 83 in zone C. In zone C, a hot streak 87 (which is a continuation of hot streak 86) is deflected, on average, by the aerodynamic turning effect of the rotating airfoils 83. The hot streak emerges from zone C, as denoted by reference numeral 88, at a second stage turbine nozzle 84 entrance plane.

Another aspect of the present invention is the circumferential alignment of the static second-stage turbine vane airfoils 84 in between the hot streaks 88 and positioning of the center of the hot streaks 88, which can be similar to the circumferential alignment of the first-stage turbine vane airfoils 82 and positioning of the hot streaks 86. Consequently, the alignment of the hot-streaks 88 is again predicated on the number of fuel nozzles 81 being equal to the number of second-stage turbine vane airfoils 84. Otherwise, like the first-stage turbine vane airfoils 82, and with an unequal number, some hot streaks 88 would pass inline with the second-stage turbine vane airfoils 84, and some in between. The impact of having a hot streak 88 impinge on a second stage vane airfoil 84 can similarly lead to a reduction in the durability of that component. Again, a reduction in durability can lead to more frequent replacement at high cost. As can be appreciated, the method and apparatus of the present invention to increase the durability of static airfoils can be generalized to extend to as many downstream stages of turbine vane airfoils as is practical.

Figure 4:
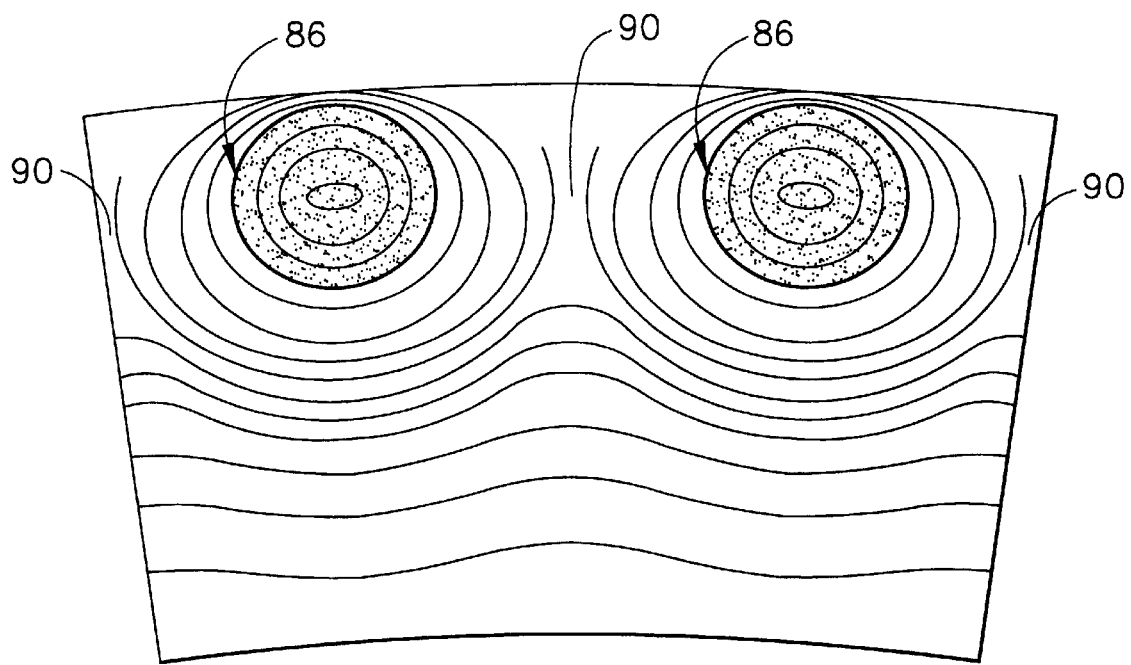
FIG. 4 is a predicted combustor exit temperature contour plot over the angular distance covered by two fuel nozzle pitches, viewed from the aft side looking forward into the combustor from the first stage nozzle inlet plane, generated by a computational fluid dynamics 3-dimension model as contemplated by the present invention, and wherein the discrete fuel nozzles are positioned in the combustor and generate a periodic temperature field over the full annulus.
Figure 5:
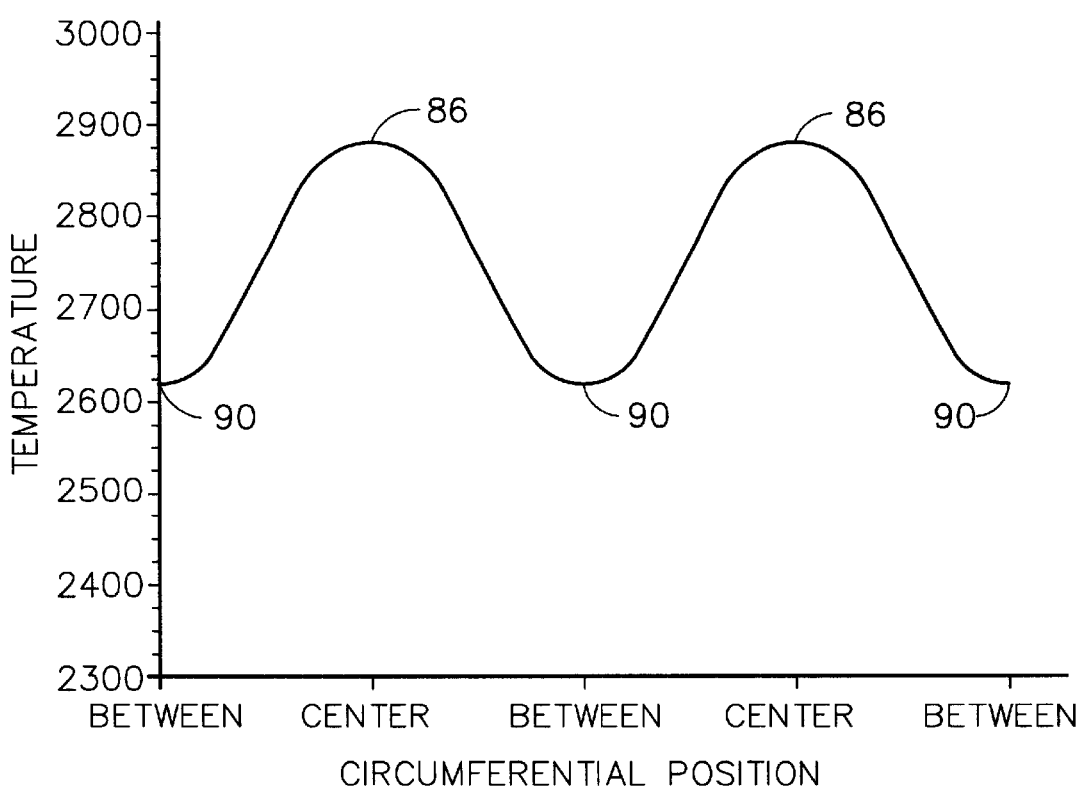
FIG. 5 is a graph similar to FIG. 4 but showing the mass averaged temperature at the first stage nozzle inlet plane as contemplated by the present invention.

Referring to FIG. 4, a conventional CFD analysis model predicts the temperature profile at a combustor exit for implementation in the present invention. The temperature distribution is typical of one that is caused by the discrete circumferential position of fuel nozzles in the combustor. In FIG. 5, and based on the CFD model, the mass averaged gas temperature from inner to outer flow path is plotted at the first stage nozzle inlet plane over a circumferential spacing of two discrete fuel nozzles. The CFD model predicts the hottest spot being at the center of the hot streak 86 and in line with the flow that traces its path directly back to the fuel nozzle. At the outmost reach of the hot streak temperature field, cool zones 90 are in line with the flow that traces its path directly back between the fuel nozzles where the static airfoils can be preferably placed in accordance with the present invention. FIG. 5 shows the location of the center of the hot streak 86 and the location of the cool zone 90 between hot streaks 86. Placing the static airfoils according to the temperature profile predicted by CFD model (or by engine or combustor rig testing) allows the temperature damage effects on such airfoils to be eliminated and/or kept at the lowest level, therefore, maximizing the durability of the vane.

The temperature profile, as in FIGS. 4 and 5, can be predicted at different operating conditions of a turbine engine. However, the present invention seeks to align the hot-streak in between the turbine vane airfoils at the hot operating temperature conditions that are determined to cause the most or increased distress to the hardware for the engine application. These hot operating temperature conditions typically occur for aircraft at take-off and hot climb, as previously mentioned, where turbine inlet temperatures are at their highest and where the majority of the oxidation and thermo-mechanical fatigue damage occurs. It is important to distinguish the hot operating temperature conditions from a transient overshoot condition which also produces a high temperature condition but only briefly for a few seconds during the operations of a turbine engine. Because of the extremely short duration of a transient overshoot, it may produce little or no damage to the airfoils, unlike the hot temperature operating conditions that last for a much longer duration in the take-off and hot climb operations as contemplated in the current invention. Therefore, in an embodiment of the invention, the center of the hot streak may be located at the center of the circumferential distance between two adjacent vane airfoils according to the temperature field profile predicted by a CFD model or experimental results at the hot operating temperature conditions in a turbine engine that are determined to cause the most hardware distress for a typical engine application.

From the foregoing, it can be seen that the present invention includes the following steps to increase vane durability. A hot operating temperature condition when the turbine engine generates a high temperature flow condition at the first stage vanes is selected. The selected condition may be one that is expected to generate the most or increased hardware distress based on a typical engine application. A circumferential temperature distribution profile of the hot temperature flow condition is mapped. A determination is made of a plurality of hot zones and a plurality of cool zones circumferentially at an inlet plane of the first stage vanes.

Further, a determination is made of a plurality of hot zone centerlines defined by two adjacent hot zones in the circumferential temperature distribution profile, with the hot zone centerlines being separated from each other by an angular distance circumferentially. The foregoing may similarly occur with respect to second stage vanes.

Next, an alignment of the first stage vane airfoils occurs circumferentially in between the hot zones according to the circumferential temperature distribution profile. Further, the first stage vane airfoils are positioned from each of the hot zone centerlines by at least 35% of said angular distance. More specifically, the first stage vane airfoils can be positioned from each of the hot zone centerlines by about 50% of the angular distance. Alternatively, a determination is made of an average angular distance of the first stage vane airfoils by dividing 360 degrees by N number of nozzles, and locating the first stage vane airfoils at the average angular distance within the cool zones of the circumferential temperature distribution profile.

In either event, a plurality of hot streaks associated with the hot zones is directed between the first stage vane airfoils such that the hot streaks avoid impingement with the first stage vane airfoils. Thereafter, the hot streaks are deflected by the aerodynamnic turning effect of the first stage vane airfoils and into the rotating blades. From the rotating blades, the hot streaks can enter the second stage stator nozzle similar to the first stage nozzle.

Alternatively, and instead of determining the above described hot zone centerlines based on adjacent hot zones, a step can include determining a plurality of first stage centerlines defined by two adjacent first stage vane airfoils, with the first stage centerlines being separated from each other by a first stage angular distance circumferentially. Next, a step includes producing a plurality of hot streaks from the fuel nozzles, with the hot streaks being characterized by a plurality of hot streak fields having center hot zones. Then, the hot streaks are directed between the first stage vane airfoils such that the center hot zones are aligned between the first stage airfoil centerlines. Thereby, the center hot zones avoid impingement with the first stage vane airfoils. With the above steps, it can be seen that the present invention eliminates the need for an alteration of the temperature gradient exiting the combustor. As such, the present invention further eliminates the need for means to achieve such alteration.

It should be understood, of course, that the foregoing relates to preferred embodiments of the invention and that modifications may be made without departing from the spirit and scope of the invention as set forth in the following claims.

We claim:

1. A method for improving vane durability in a turbine engine having a plurality of fuel nozzles, a plurality of first stage vane airfoils, and a plurality of rotating blades, comprising:

selecting a hot operating temperature condition when said turbine engine generates a hot temperature flow condition at said first stage static vanes;

said hot temperature flow condition able to generate vane distress;

mapping a circumferential temperature distribution of said hot temperature flow condition;

determining a plurality of hot zones and a plurality of cool zones circumferentially at an inlet plane of said first stage vanes; and aligning said first stage vanes circumferentially in between said hot zones according to said circumferential temperature distribution profile.

2. The method of claim 1, further comprising:

determining a plurality of hot zone centerlines defined by two adjacent hot zones in said circumferential temperature distribution profile, said centerlines being separated from each other by an angular distance circumferentially; and positioning said first stage vane airfoils from each of said centerlines by at least 35% of said angular distance.

3. The method of claim 2, further comprising positioning said first stage vane airfoils from each of said hot zone centerlines by about 50% of said angular distance.

4. The method of claim 1, further comprising directing a plurality of hot streaks associated with said hot zones between said first stage vane airfoil such that said hot streaks avoid impingement with said first stage vane airfoils.

5. The method of claim 1, further comprising deflecting a plurality of hot streaks from said fuel nozzles and into said rotating blades.

6. The method of claim 5, wherein deflecting said hot streaks comprises altering a direction of said hot streaks by said first-stage vane airfoils.

7. A method for improving vane durability in a turbine engine having a plurality of fuel nozzles, a plurality of first stage vane airfoils downstream of said fuel nozzles, a plurality of rotating blades downstream of said first stage vane airfoils, and a plurality of second stage vane airfoils downstream of said rotating blades, comprising:

selecting a second stage hot operating temperature condition when said turbine engine generates a second stage hot temperature flow condition at said second stage vane airfoils;

said second hot temperature flow condition able to generate vane distress;

mapping a second stage circumferential temperature distribution of said second stage hot temperature flow condition;

determining a plurality of second stage hot zones and a plurality of second stage cool zones circumferentially at an inlet plane of said second stage vane airfoils; and aligning said second stage vane airfoils circumferentially in between said second stage hot zones according to said second stage circumferential temperature distribution.

8. The method of claim 7, further comprising:

selecting a first stage hot operating temperature condition when said turbine engine generates a first hot temperature flow condition at said first stage vane airfoils;

said first hot temperature flow condition able to generate vane distress;

mapping a first stage circumferential temperature distribution of said first stage hot temperature flow condition;

determining a plurality of first stage hot zones and a plurality of first stage cool zones circumferentially at an inlet plane of said first stage vane airfoils; and aligning said first stage vane airfoils circumferentially in between said first stage hot zones according to said first stage circumferential temperature distribution.

9. The method of claim 8, further comprising:

determining a plurality of first stage hot zone centerlines defined by two adjacent first stage hot zones in said first stage circumferential temperature distribution, said first stage hot zone centerlines being separated from each other by a first stage angular distance circumferentially;

positioning said first stage vane airfoils from each of said first stage hot zone centerlines by at least 35% of said first stage angular distance;

determining a plurality of second stage hot zone centerlines defined by two adjacent second stage hot zones in said second stage circumferential temperature distribution, said second stage hot zone centerlines being separated from each other by a second stage angular distance circumferentially;

positioning said second stage vane airfoils from each of said second stage hot zone centerlines by at least 35% of said second stage angular distance.

10. The method of claim 9, further comprising:

positioning said first stage vane airfoils from each of said first stage hot zone centerlines by about 50% of said first stage angular distance; and positioning said second stage vane airfoils from each of said second stage hot zone centerlines by about 50% of said second stage angular distance.

11. The method of claim 7, further comprising:

directing a plurality of hot streaks associated said first stage hot zones between said first stage vane airfoils such that said hot streaks avoid impingement with said first stage vane airfoils; and directing said hot streaks between said second stage vane airfoils such that said hot streaks avoid impingement with said second stage vane airfoils.

12. The method of claim 7, further comprising deflecting a plurality of hot streaks from said fuel nozzles and into said rotating blades.

13. The method of claim 12, wherein deflecting said hot streaks comprises altering a direction of said hot streaks by said first-stage vane airfoils.

14. The method of claim 13, further comprising deflecting said hot streaks from said rotating blades.

15. The method of claim 14, further comprising deflecting said hot streaks from said rotating blades and into said second stage vane airfoils.

16. A method for improving vane durability in a turbine engine having a plurality of fuel nozzles, a plurality of first stage vane airfoils downstream of said fuel nozzles, a plurality of rotating blades downstream of said first stage vane airfoils, and a plurality of second stage vane airfoils downstream of said rotating blades, comprising:

determining a plurality of first stage centerlines defined by two adjacent first stage vane airfoils, said first stage centerlines being separated from each other by a first stage angular distance circumferentially;

producing a plurality of hot streaks from said fuel nozzles, said hot streaks being characterized by a plurality of hot streak fields having center hot zones;

directing said hot streaks between said first stage vane airfoils such that said center hot zones are aligned with said first stage centerlines;

wherein said center hot zones avoid impingement with said first stage vane airfoils.

17. The method of claim 16, wherein, when said center hot zones are directed between adjacent first stage vane airfoils, said center hot zones are disposed away from each of said first stage vane airfoils by a distance of at least 35% of said first stage angular distance.

18. The method of claim 16, wherein said hot streak fields further comprise a plurality of peripheral areas, and said peripheral areas avoid impingement with said first vane airfoils.

19. The method of claim 16, further comprising:

determining a plurality of second stage centerlines defined by two adjacent second stage vanes, said second stage centerlines being separated from each other by a second stage angular distance circumferentially;

directing said hot streaks between said second stage vane airfoils such that said center hot zones are aligned with said second stage centerlines.

20. The method of claim 19, wherein, when said center hot zones are directed between adjacent second stage vane airfoils, said center hot zones are disposed away from each of said second stage vane airfoils by a distance of at least 35% of said second stage angular distance.

21. The method of claim 19, wherein said hot streak fields further comprise a plurality of peripheral areas, and said peripheral areas avoid impingement with said second vane airfoils.

22. The method of claim 16, wherein the number of fuel nozzles is equal to the number of first stage vane airfoils.

23. The method of claim 16, wherein the number of fuel nozzles is equal to the number of second stage vane airfoils.

24. A method for improving hot section vane durability in a turbine engine having N number of fuel nozzles and N number of first stage vane airfoils, comprising:

selecting a hot operating temperature condition when said turbine engine is expected to generate a hot temperature flow condition at said first stage vane airfoils;

said hot operating temperature flow condition able to generate vane distress;

mapping a circumferential temperature distribution at said hot temperature flow condition to determine a plurality of hot zones and a plurality of cool zones circumferentially at an inlet plane of said first stage vane airfoils;

aligning said first stage vane airfoils circumferentially in between said hot zones according to said circumferential temperature distribution;

determining an average angular distance of said first stage vane airfoils by dividing 360 degrees by N; and locating said first stage vane airfoils at said average angular distance within said cool zones of said circumferential temperature distribution.

25. A turbine engine, comprising:

N number of fuel nozzles circumferentially spaced from one another;

N number of first stage stationary vane airfoils downstream of said fuel nozzles;

a plurality of first stage rotating blades downstream of said first stage stationary vane airfoils;

wherein said first stage stationary vane airfoils are selectively spaced circumferentially to situate hot zones of hot streaks from said fuel nozzles between said first stage stationary vane airfoils;

wherein said N number of fuel nozzles is equal to said N number of said first stage stationary vane airfoils; and wherein said hot zones avoid impingement with said first stage stationary vane airfoils.

26. The turbine engine according to claim 25, wherein:

centerlines of two adjacent hot zones are separated from each other by an angular distance circumferentially; and said first stage stationary vane airfoils are positioned from each of said centerlines by at least 35% of said angular distance.

27. The turbine engine according to claim 26, wherein said first stage stationary vane airfoils are positioned from each of said centerlines by about 50% of said angular distance.

28. The turbine engine according to claim 25, wherein said hot streaks are deflected by said first stage stationary vane airfoils.

29. The turbine engine according to claim 25, further comprising:

N number of static second stage vane airfoils, wherein said N number of static second stage vane airfoils is equal to said N number of fuel nozzles and said N number of first stage stationary vane airfoils.

30. The turbine engine according to claim 29, wherein said static second stage vane airfoils are selectively spaced circumferentially to situate said hot zones therebetween.

* * * * *